United States Patent
Matsubara et al.

(10) Patent No.: US 9,464,341 B2
(45) Date of Patent: Oct. 11, 2016

(54) FLASH VESSEL AND METHOD FOR OPERATING SAME

(71) Applicant: SUMITOMO METAL MINING CO., LTD., Tokyo (JP)

(72) Inventors: Satoshi Matsubara, Tokyo (JP); Osamu Nakai, Tokyo (JP); Yoji Kyoda, Tokyo (JP); Takashi Sakamoto, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 249 days.

(21) Appl. No.: 14/370,882

(22) PCT Filed: Dec. 27, 2012

(86) PCT No.: PCT/JP2012/083948
§ 371 (c)(1),
(2) Date: Jul. 7, 2014

(87) PCT Pub. No.: WO2013/105454
PCT Pub. Date: Jul. 18, 2013

(65) Prior Publication Data
US 2015/0145183 A1   May 28, 2015

(30) Foreign Application Priority Data

Jan. 13, 2012 (JP) ................................. 2012-005442

(51) Int. Cl.
*C22B 3/00* (2006.01)
*C22B 3/02* (2006.01)
(Continued)

(52) U.S. Cl.
CPC ................ *C22B 23/043* (2013.01); *B01J 3/04* (2013.01); *B01J 4/008* (2013.01); *C22B 3/02* (2013.01);
(Continued)

(58) Field of Classification Search
CPC .................................. C22B 3/02; C22B 3/08
USPC .......................................................... 75/743
See application file for complete search history.

(56) References Cited

U.S. PATENT DOCUMENTS 4,466,253 A   8/1984   Jaster
5,052,426 A   10/1991  Kasper
(Continued)

FOREIGN PATENT DOCUMENTS

JP   A-55-96419   7/1980
JP   A-9-218072   8/1997
(Continued)

OTHER PUBLICATIONS

International Search Report issued in International Patent Application No. PCT/JP2012/083948 dated Mar. 26, 2013 (with translation).

(Continued)

*Primary Examiner* — Scott Kastler
(74) *Attorney, Agent, or Firm* — Oliff PLC

(57) ABSTRACT

A hydrostatic tower whose lower part communicates with a liquid phase space within a flash vessel, and whose upper part communicates with a gas phase space within the flash vessel is provided. A rising liquid level within the hydrostatic tower is detected by at least one maximum liquid level sensor provided at a position at the same level as a predetermined maximum liquid level within the liquid phase space. A dropping liquid level within the hydrostatic tower is detected by at least one minimum liquid level sensor provided at a position at the same level as a predetermined minimum liquid level within the liquid phase space.

3 Claims, 3 Drawing Sheets

(51) Int. Cl.
*C22B 3/04* (2006.01)
*B01J 3/04* (2006.01)
*B01J 4/00* (2006.01)
*C22B 3/08* (2006.01)

(52) U.S. Cl.
CPC . *C22B 3/04* (2013.01); *C22B 3/08* (2013.01); *B01J 2219/00182* (2013.01); *Y02P 10/234* (2015.11)

(56) References Cited

U.S. PATENT DOCUMENTS

| 2010/0028227 | A1 | 2/2010 | Shibayama et al. | |
|---|---|---|---|---|
| 2011/0174113 | A1* | 7/2011 | Motteram | C22B 3/08 75/743 |
| 2015/0044112 | A1* | 2/2015 | Matsubara | C22B 3/02 423/150.1 |
| 2015/0145183 | A1* | 5/2015 | Matsubara | C22B 3/02 266/44 |

FOREIGN PATENT DOCUMENTS

| JP | A-10-80700 | 3/1998 |
|---|---|---|
| JP | A-2009-524797 | 7/2009 |
| JP | A-2010-31341 | 2/2010 |
| JP | A-2010-59489 | 3/2010 |
| WO | 2008/039204 A1 | 4/2008 |

OTHER PUBLICATIONS

Jun. 16, 2015 Extended Search Report issued in European Application No. 12865429.0.

* cited by examiner

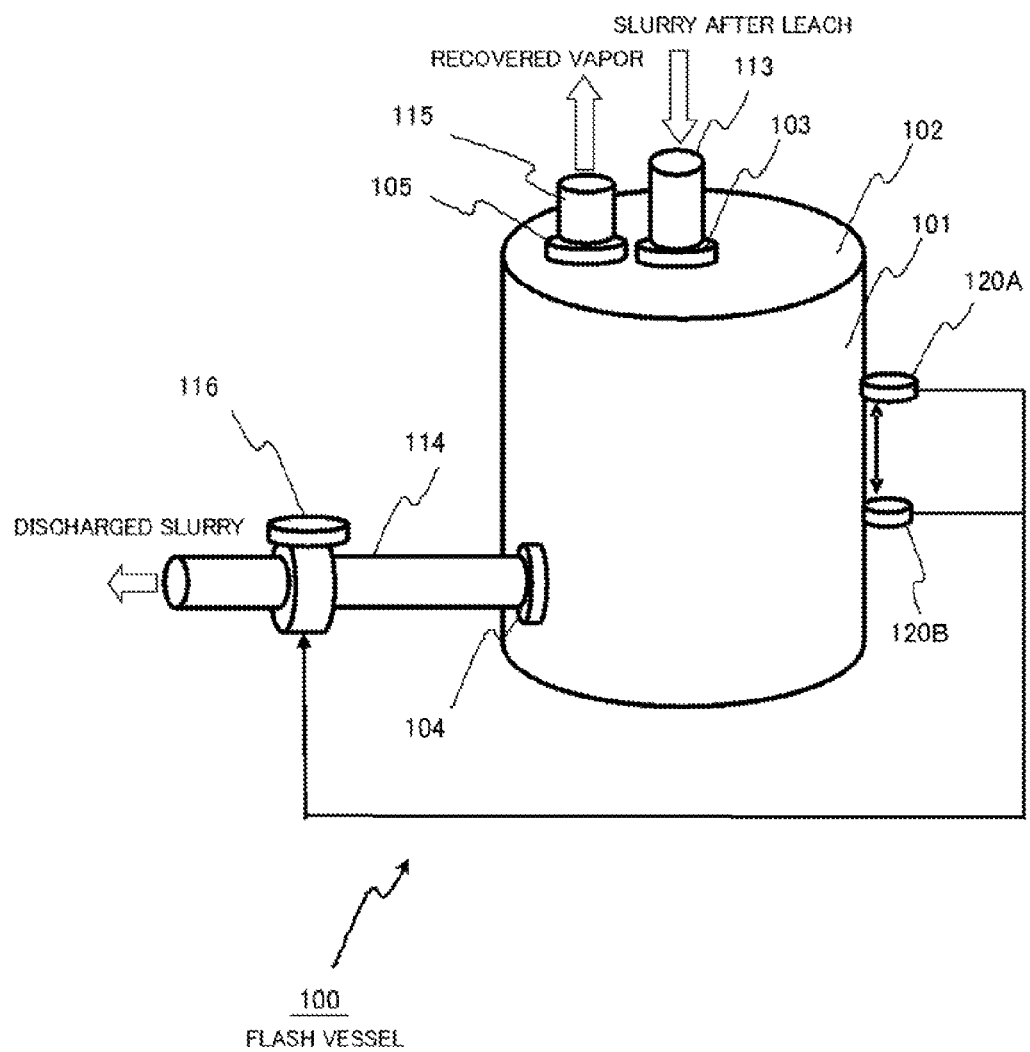
FIG. 3 - PRIOR ART

FLASH VESSEL AND METHOD FOR OPERATING SAME

TECHNICAL FIELD

The present invention relates to a flash vessel and a method for operating same, and more particularly to a flash vessel and a method for operating same vessel used in a high pressure acid leach step which includes leaching material slurry under high temperature and pressure conditions by using an autoclave (high-pressure reaction vessel), and then reducing the temperature and pressure of the slurry after leach to the ordinary temperature and ordinary pressure by using a flash vessel (temperature and pressure reduction vessel). This application claims priority of Japanese Patent Application No. 2012-005442, filed on Jan. 13, 2012, the entirety of which is hereby incorporated by reference.

BACKGROUND ART

Recently, with development of material having effective corrosion resistivity under high temperature and pressure conditions, high temperature pressurized acid leach (high pressure acid leach) which uses sulfuric acid has been attracting attention as a hydrometallurgical process of nickel oxide ore (for example, see Patent Literature 1). This method does not include dry steps such as deoxidizing and drying step, but includes consistent wet steps unlike a conventional typical dry smelting method for nickel oxide ore and accordingly, the high pressure acid leach is advantageous in view of energy-saving and cost-performance. More specifically, in the high pressure acid leach, iron corresponding to a main impurity is fixed as leach residue in the form of hematite ($Fe_2O_3$) by controlling the oxidization-reduction potential and temperature of the leachate within the pressurized leach reaction vessel in the leach step. In this case, selective separation of nickel and cobalt from iron is allowed and this method is therefore considered extremely advantageous.

For example, high pressure acid leach using an autoclave is adopted as a hydrometallurgical process of nickel oxide ore. According to this method, during a high pressure acid leach step which includes leaching material slurry under high temperature and pressure conditions by using an autoclave and then reducing the temperature and pressure of the slurry after leach by using a flash vessel, the liquid level within the flash vessel is generally measured by a sensor directly attached to the flash vessel.

As can be seen from the general structure of a typical flash vessel 100 in FIG. 3, the flash vessel 100 includes a bottomed cylindrical body 101. A slurry inlet port 103 and a vapor outlet port 105 are provided at a ceiling portion 102 which closes the upper part of the body 101. In addition, a slurry outlet port 104 is provided at the body 101. A slurry inlet pipe 113, through which slurry after leach and reduction to predetermined temperature and predetermined pressure (hereinafter simply abbreviated as slurry in some cases) is introduced into the interior of the flash vessel 100, is coupled with the slurry inlet port 103. A slurry outlet pipe 114, through which the slurry having entered the interior of the flash vessel 100 is discharged, is coupled with the slurry outlet port 104. A vapor outlet pipe 115, through which vapor generated within the flash vessel 100 by introduction of the slurry is recovered, is coupled with the vapor outlet port 105. A slurry outlet valve 116 is provided on the slurry outlet pipe 114 coupled with the slurry outlet port 104.

According to the flash vessel 100, slurry after leach and reduction to predetermined temperature and predetermined pressure (hereinafter abbreviated as slurry in some cases) is introduced through the slurry inlet port 103, the slurry having entered the interior of the flash vessel 100 is discharged through the slurry outlet port 104 and the vapor generated by introduction of the slurry is discharged through the vapor outlet port 105.

In this case, the liquid level within the flash vessel 100 is maintained at an appropriate level based on measurement results of the liquid level within the flash vessel obtained by using liquid level sensors 120A and 120B.

For example, in the case of measurement of the liquid level using the liquid level sensor 120A for the maximum liquid level and the liquid level sensor 120B for the minimum liquid level, the slurry remaining within the flash vessel 100 is discharged by opening the slurry outlet valve 116 when the liquid level sensor 120A disposed at the maximum liquid level detects a rising liquid level. On the other hand, when the liquid level sensor 120B disposed at the minimum liquid level comes into a condition unable to detect the liquid level by a drop of the liquid level, the discharge of the slurry from the flash vessel 100 is stopped by closing the slurry outlet valve 116. Consequently, the slurry liquid level within the flash vessel 100 is adjusted within the range between the maximum liquid level and the minimum liquid level. For successive measurement of the liquid level, the discharge amount of the slurry remaining within the flash vessel 100 is raised by increasing the opening of the slurry outlet valve 116 when the liquid level exceeds the control liquid level, and reduced by decreasing the opening of the slurry outlet valve 116 when the liquid level becomes lower than the control liquid level.

In general, the leach reaction in the high pressure acid leach step is controlled based on control factors (pH and oxidation-reduction potential) of leach reaction produced by using a leaching agent, as well as based on temperature. For example, in a leaching method using chlorine gas as a leaching agent, the leaching reaction is controlled by oxidation-reduction potential in the leachate. In this case, the pressure within the autoclave is not directly controlled, and thus is not necessarily stable or constant during the leaching operation. Accordingly, the pressure is variable in accordance with the injective amount of chlorine gas controlled by the oxidation-reduction potential.

When the leaching agent is liquid and does not generate gas by reaction, the pressure within the autoclave is generally produced by saturated vapor pressure dependent on temperature. For example, in recent years, high pressure acid leach using an autoclave is adopted as a hydrometallurgical process of nickel oxide ore so as to recover valuable metal such as nickel and cobalt.

According to this high pressure acid leach, for example, ore slurry containing ore having a predetermined slurry concentration and a size of 2 mm or smaller is initially prepared by using pulverizing equipment and screening equipment and the ore slurry is supplied to the high pressure acid leach step. In this step, the temperature and pressure of the ore slurry are increased step by step by using a preheater (temperature and pressure raising equipment), and the resultant slurry is supplied to an autoclave. In this autoclave, nickel and cobalt contained in the ore, and a part of impurity elements such as iron, aluminum, and zinc are leached by using sulfuric acid to obtain slurry containing these materials after leach. Then, the slurry after leach is supplied from the autoclave to a flash vessel which reduces the temperature and pressure of the slurry after leach to the ordinary temperature and pressure, where the temperature and pressure of the slurry are reduced step by step. Thereafter, the slurry undergoes a preliminary neutralization step for neutralizing free sulfuric acid within the leachate, a solid-liquid separation step implemented by thickeners with a multiple—stage types, and other steps to be separated into leach residues and leachate.

The adoption of the flash vessel in the high pressure acid leach step eliminates the gap between the operation condition of the autoclave used in the high pressure acid leach step and that in the subsequent step. More specifically, the leach condition for the autoclave is generally adjusted to a temperature approximately in the range from 200° C. to 300° C. for obtaining high leach rate of nickel and cobalt. On the other hand, in the subsequent preliminary neutralization step or solid-liquid separation step, the operation is generally performed under the atmospheric pressure for safety and economic reasons. Accordingly, the flash vessel reduces the temperature and pressure while recovering pressurized vapor step by step from the high-temperature and high-pressure slurry after leach.

In the high pressure acid leach step, extremely expensive pipes constituted by material and structure resistant to high temperature and high pressure are provided in the piping for supplying slurry after leach from the autoclave to the flash vessel, the piping for supplying the recovered vapor to the preheater of ore slurry, the piping for increasing the temperature and pressure of the ore slurry step by step, and other piping. Accordingly, for meeting the demand for improvement of the entire cost-performance including the material cost, each piece of equipment is arranged in an appropriate position with the respective piping shortened. In this arrangement, the slurry after leach is transferred from the autoclave to the first step flash vessel, and then transferred sequentially to the subsequent flash vessels. The transfer of slurry after leach between the respective flash vessels is conducted by a method using the height differences of the places where the respective flash vessels are installed, and the pressure differences between the respective stages, rather than by adopting a mechanical transfer method such as a pump. This type of transfer is adopted in consideration of the durability and cost of the transfer equipment which transfers slurry after leach containing sulfuric acid. For example, according to a practical plant where an autoclave containing a cylindrical vessel having a size approximately in the range from 4 m to 6 m in diameter and approximately in the range from 25 m to 30 m in length is horizontally installed, the first stage flash vessel is located at a position corresponding to the height approximately in the range from 25 m to 35 m above the autoclave.

The pressurized vapor recovered step by step from the high-temperature and high-pressure slurry after leach is supplied from the flash vessels in the respective stages to preheaters having approximately the same temperature and pressure and the piping in this process is also provided with extremely expensive pipes made of material and structure sufficiently resistant to the pressurized vapor having high temperature and high pressure similarly to above.

However, the problem of damage to the vapor outlet pipe, the slurry outlet pipe, the valve and the like is not completely solved. During one-year operation, approximately ten times of troubles are caused in total, such as damage to the vapor outlet pipe, and damage to slurry outlet valve and accordingly, a practical technology capable of further reducing the problem of these failures has been demanded.

The estimated factor causing these problems is the insufficient control of the liquid level. More specifically, the slurry liquid level does not become flat in the condition where steam is generated by introduction of the high-temperature and high pressure slurry after leach into the flash vessel and rather than that, it is assumed that the liquid level is heavily variable by the steam generated from the depth of the slurry, in which condition the control of the liquid level is insufficient.

More specifically, in the high pressure acid leach step using the autoclave adopted as the wet smelting method for nickel oxide ore, the flash vessel, which reduces the temperature and pressure of the slurry obtained by leaching material slurry under high temperature and pressure conditions using the autoclave, is a large-sized flash vessel handling strong acid slurry. Accordingly, an inspection hole is difficult to be formed for technical reasons and visual inspection is substantially impossible.

Even when the actual liquid level in the conventional flash vessel 100 is high, for example, there is a possibility that the liquid level sensor 120A disposed at the maximum liquid level does not detect this condition due to considerable rise and drop of the liquid level. In this case, the liquid level control by the slurry outlet valve 116 does not work, and therefore operation is continued with the liquid level within the flash vessel 100 kept high and as a result, acid slurry is carried toward the preheater with the recovered vapor, whereby corrosion of the recovery vapor outlet pipe 115 may develop by the supply of the acid slurry. Similarly, even when the actual liquid level is low, there is a possibility that the liquid level sensor 120B disposed at the minimum liquid level does not detect this condition. In this case, the liquid level control by the slurry outlet valve 116 does not work, and the actual liquid level becomes lower than the slurry outlet pipe 114 and the vapor within the flash vessel 100 is discharged to the flash vessel disposed in the stage subsequent to the slurry outlet pipe 114 together with the discharged slurry, whereby the slurry flow speed within the outlet pipe temporarily increases and as a result, the slurry outlet pipe 114 and the valve may be broken, or the amount of the introduced vapor from the flash tank in the subsequent stage into the recovery vapor pipe temporarily increases. In this condition, corrosion and abrasion of the recovery vapor pipe may develop with increase in the carried sulfuric acid and increase in the flow speed.

For example, Patent Literature 2 discloses a technology relating to organic sludge slurry condensing method which constantly locates the liquid level of condensed liquid to an upper position than an outlet port based on detection of the liquid level within a flash vessel. However, this method is difficult to be adopted as it is due to the extremely different conditions in the point that the method is targeted to organic sludge slurry, and that the vapor pressure is only 2.5 atm, for example.

In addition, for example, Patent Literature 3 discloses a technology which controls refrigerant charge into a refrigerant vapor compression system by using at least one sensor provided to detect the level of liquid refrigerant within a flash vessel included in the system. However, this technology uses a sensor of float type or ultrasonic type, for example, which is applicable only when the liquid level is flat. Accordingly, this technology is difficult to adopt to the foregoing problems.

CITATION LIST

Patent Literature

Patent Literature 1: JP 2010-059489 A
Patent Literature 2: JP 10-080700 A
Patent Literature 3: JP 2009-524797 W

SUMMARY OF INVENTION

Technical Problem

In consideration of the conventional problems, it is an object of the invention to provide a flash vessel and a method for operating same used in a high pressure acid leach step which includes leaching material slurry under high temperature and pressure conditions by using an autoclave, and reducing the temperature and pressure of the slurry after leach to the ordinary temperature and ordinary pressure by using the flash vessel. This flash vessel appropriately controls the opening and closing of a valve based on highly accurate information on the slurry liquid level obtained by raising the accuracy of the liquid level measurement of the flash vessel and accordingly, the flash vessel and the method for operating same can reduce troubles of a vapor outlet pipe, a slurry outlet pipe, and a slurry outlet valve. Other objects of the invention, and specific advantages offered by the invention will be apparent from the description of an embodiment discussed below.

Solution to Problem

For achieving the aforementioned object, the present inventors devoted themselves to the studies of liquid level measurement of a flash vessel used in a high pressure acid leach step which includes leaching material slurry under high temperature and pressure conditions by using an autoclave, and reducing the temperature and pressure of the slurry after leach to the ordinary temperature and ordinary pressure by using the flash vessel. After repeated studies, the inventors have found that the liquid level measurement accuracy improves when the liquid level is measured in a hydrostatic tower provided on the flash vessel, and finally completed the invention described below.

In other words, according to the present invention, a flash vessel whose liquid level rises and drops considerably used in a high pressure acid leach step which includes leaching nickel oxide ore slurry under high temperature and pressure conditions by using an autoclave, and reducing the temperature and pressure of the slurry after leach to the ordinary temperature and ordinary pressure by using the flash vessel, includes: a hydrostatic tower whose lower part is coupled with an arbitrary position on a slurry outlet pipe between the connection position of the slurry outlet pipe and the flash vessel and the position of a slurry outlet valve, and whose upper part is coupled with an arbitrary position on a vapor outlet pipe;

at least one maximum liquid level sensor provided at a position at the same level as a maximum liquid level not causing inflow of the slurry into the vapor outlet pipe due to considerable rise and drop of the slurry liquid level within the liquid phase space of the flash vessel to detect a rising liquid level within the hydrostatic tower;

at least one minimum liquid level sensor provided at a position at the same level as a minimum liquid level not causing inflow of vapor into the slurry outlet pipe due to considerable rise and drop of he slurry liquid level within the liquid phase space to detect a dropping liquid level within the hydrostatic tower; and a slurry outlet valve controlled opening and closing according to the detection output by the maximum liquid level sensor and the minimum liquid level sensor detecting the liquid level of the hydrostatic tower, opened when the maximum liquid level sensor detects a rising liquid level within the hydrostatic tower and closed When the minimum liquid level sensor detects a dropping liquid level within the hydrostatic tower.

According to the flash vessel of the invention, for example, a diameter A of the hydrostatic tower may lie in the range $1/100 \times B \leq A \leq 1/5 \times B$ in comparison with a diameter B of the flash vessel.

A method for operating a flash vessel whose liquid level rises and drops considerably according to the invention used in a high pressure acid leach step which includes leaching nickel oxide ore slurry under high temperature and pressure conditions by using an autoclave, and reducing the temperature and pressure of the slurry after leach to the ordinary temperature and ordinary pressure by using the flash vessel, includes: detecting a liquid level within a hydrostatic tower whose lower part is coupled with an arbitrary position on a slurry outlet pipe between the connection position of the slurry outlet pipe and the flash vessel and the position of a slurry outlet valve, and whose upper part is coupled with an arbitrary position on a vapor outlet by using at least one maximum liquid level sensor provided at a position at the same level as a maximum liquid level not causing inflow of the slurry into the vapor outlet pipe due to considerable rise and drop of the slurry liquid level within the liquid phase space of the flash vessel and at least one minimum liquid level sensor provided at a position at the same level as a minimum liquid level not causing a inflow of vapor into the slurry outlet pipe due to considerable rise and drop of the slurry liquid level within the liquid phase space, and opening a slurry outlet valve provided on a slurry outlet pipe derived from the flash vessel when the maximum liquid level sensor detects a rising liquid level within the hydrostatic tower, and closing the slurry outlet valve when the minimum liquid level sensor detects a dropping liquid level within the hydrostatic tower.

Advantageous Effects of Invention

According to the flash vessel and the method for operating same of the invention used in a high pressure acid leach step which includes leaching material slurry under high temperature and pressure conditions by using an autoclave, and reducing the temperature and pressure of the slurry after leach to the ordinary temperature and ordinary pressure by using the flash vessel, the opening and closing of a valve is appropriately controlled based on highly accurate information on the slurry liquid level obtained by raising the accuracy of the liquid level measurement of the flash vessel. Accordingly, the flash vessel and the method for operating same can reduce troubles of a vapor outlet pipe, a slurry outlet pipe, and a slurry outlet valve and these technical achievements are extremely advantageous.

BRIEF DESCRIPTION OF DRAWINGS

FIG. 3 illustrates the general structure of a typical flash vessel.

DESCRIPTION OF EMBODIMENTS

An embodiment of the invention is hereinafter described in detail with reference to the drawings.

Figure 1:
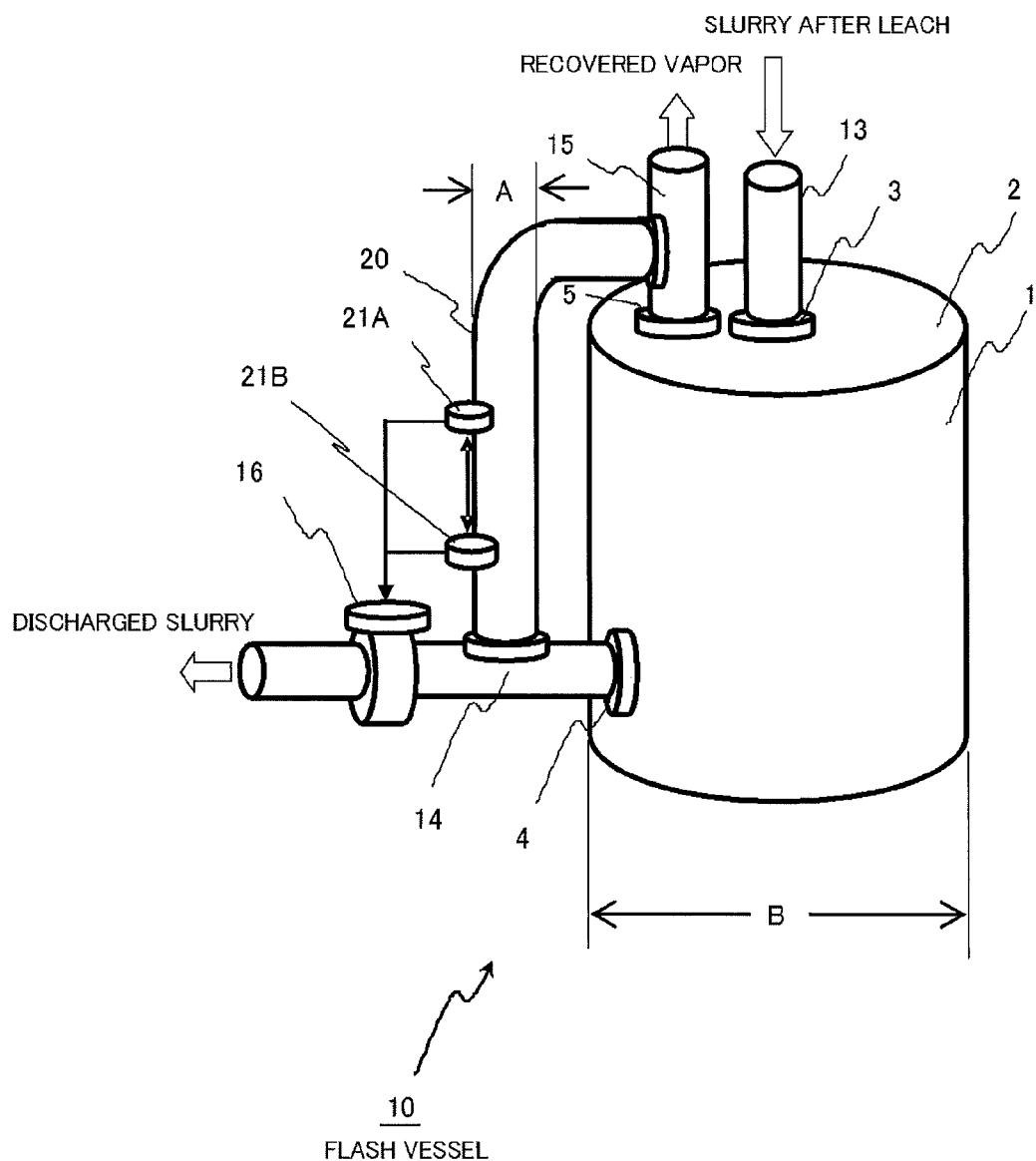
FIG. 1 illustrates a structure example of a flash vessel to which the invention is applied.

The invention is applicable to a flash vessel 10 having the structure illustrated in FIG. 1, for example.

The flash vessel 10 is a flash vessel used in a high pressure acid leach step which leaches material slurry under high temperature and pressure conditions using an autoclave, and reduces the temperature and pressure of the slurry after leach to the ordinary temperature and pressure. The flash vessel 10 includes a bottomed cylindrical body 1 and a slurry inlet port 3 and a vapor outlet port 5 are formed in a ceiling portion 2 closing the upper part of the body 1. In addition, a slurry outlet port 4 is provided at the body 1.

A slurry inlet pipe 13, through which slurry after leach and reduction to predetermined temperature and predetermined pressure is introduced into the flash vessel 10, is coupled with the slurry inlet port 3. A slurry outlet pipe 14, through which slurry having entered the inside of the flash vessel 10 is discharged, is coupled with the slurry outlet port 4. A vapor outlet pipe 15, through which vapor generated within the flash vessel 10 by introduction of slurry is recovered, is coupled with the vapor outlet port 5. A slurry outlet valve 16 is provided on the slurry outlet pipe 14 coupled with the slurry outlet port 4.

According to the flash vessel 10, slurry after leach and reduction to the predetermined temperature and predetermined pressure is introduced through the slurry inlet port 3 and slurry having entered the interior of the flash vessel 10 is discharged through the slurry outlet port 4 and vapor generated by introduction of slurry is discharged through the vapor outlet port 5.

The material slurry in this context is nickel oxide ore slurry. According to the flash vessel 10, slurry obtained by leaching nickel oxide ore slurry using sulfuric acid is introduced into the flash vessel 10, and the temperature and pressure of the introduced slurry are reduced to the ordinary temperature and ordinary pressure.

The flash vessel 10 includes a hydrostatic tower 20 whose lower part communicates with a liquid phase space within the flash vessel 10, and whose upper part communicates with a gas phase space within the flash vessel 10.

According to the flash vessel 10, the lower part of the hydrostatic tower 20 is coupled with an arbitrary position on the slurry outlet pipe 14 between the connection position of the slurry outlet pipe 14 and the flash vessel 10 and the position of the slurry outlet valve 16. The upper part of the hydrostatic tower 20 is coupled with an arbitrary position on the vapor outlet pipe 15.

The diameter of the hydrostatic tower 20 is not particularly limited, however, it is preferable that a diameter A of the hydrostatic tower 20 lies in the range $1/100 \times B \leq A \leq 1/5 \times B$ in comparison with a diameter B of the flash vessel 10. When the diameter A is excessively large, it is concerned that the cost for investment may increase and that slurry may remain within the hydrostatic tower 20 while when the diameter is excessively small, it is concerned that the hydrostatic tower 20 may be affected by the considerable rise and drop of the liquid level and that the pipes may be easily closed by slurry.

The hydrostatic tower 20 is provided with at least one maximum liquid level sensor 21A, and at least one minimum liquid level sensor 21B: The maximum liquid level sensor 21A is disposed at the same level as a predetermined maximum liquid level in the liquid phase space, and detects a rising liquid level within the hydrostatic tower 20. The minimum liquid level sensor 21B is disposed at the same level as a predetermined minimum liquid level in the liquid phase space, and detects a dropping liquid level within the hydrostatic tower 20.

According to the flash vessel 10, the liquid level within the flash vessel 10 is maintained at an appropriate level by controlling the valve opening of the slurry outlet valve 16 in accordance with the liquid level measurement results obtained by the liquid level sensors 21A and 21B provided on the hydrostatic tower 20.

More specifically, the flash vessel 10 as a flash vessel used in a high pressure acid leach step which leaches material slurry under high temperature and pressure conditions using an autoclave, and reduces the temperature and pressure of the slurry after leach to the ordinary temperature and ordinary pressure, is operated in the following manners.

The lower part of the hydrostatic tower 20 communicates with the liquid phase space within the flash vessel 10, while the upper part of the hydrostatic tower 20 communicates with the gas phase space within the flash vessel 10. The liquid level within the hydrostatic tower 20 is detected by at least the one maximum liquid level sensor 21A disposed at the same level as a predetermined maximum liquid level in the liquid phase space, and the one minimum liquid level sensor 21B disposed at the same level as a predetermined minimum liquid level in the liquid phase space. The slurry outlet valve 16 disposed on the slurry outlet pipe 14 derived from the flash vessel 10 is opened when the maximum liquid level sensor 21A detects a rising liquid level within the hydrostatic tower 20, and closed when the minimum liquid level sensor 21B detects a dropping liquid level within the hydrostatic tower 20.

By this operation, the slurry liquid level within the flash vessel 10 can be adjusted to a level within an appropriate range. In this case, vapor is difficult to flow toward the slurry outlet pipe 14 side, and therefore the problem of damage to the slurry outlet valve 16 decreases.

The material slurry introduced into the flash vessel 10 is not particularly limited. The material slurry includes materials containing various types of metal compounds from which desired metal is leached by high pressure acid leach, such as metal, sulfide, oxide, and ore slurry composed of nickel oxide ore is preferable, for example.

The high pressure acid leach step is not particularly limited and the step includes preheaters employed in typical high pressure acid leach for increasing the temperature and pressure of ore slurry step by step, as well as the autoclave and the flash vessels.

The autoclave is not particularly limited and the autoclave includes a vertical-type or horizontal-type pressurizing vessel heated externally or heated by blown-in pressurized steam. The flash vessel 10 is not particularly limited. The flash vessel 10 is constituted by a multistage-type flash vessel. The preheaters are not particularly limited. The preheaters are constituted by multistage-type counterflow direct-heating type heat exchangers. In this case, steam is used as the heating medium. The steam used herein may be steam generated by using a boiler or by other typical methods. It is preferable, however, that the steam generated in the flash vessel at the time of step-by-step reduction of the temperature and pressure of the slurry after leach and discharge from the autoclave is recovered and circulated to be used as the heating medium.

An example of high pressure acid leach for nickel oxide ore adopting the flash vessel 10 and the method for operating same is described below.

Figure 2:
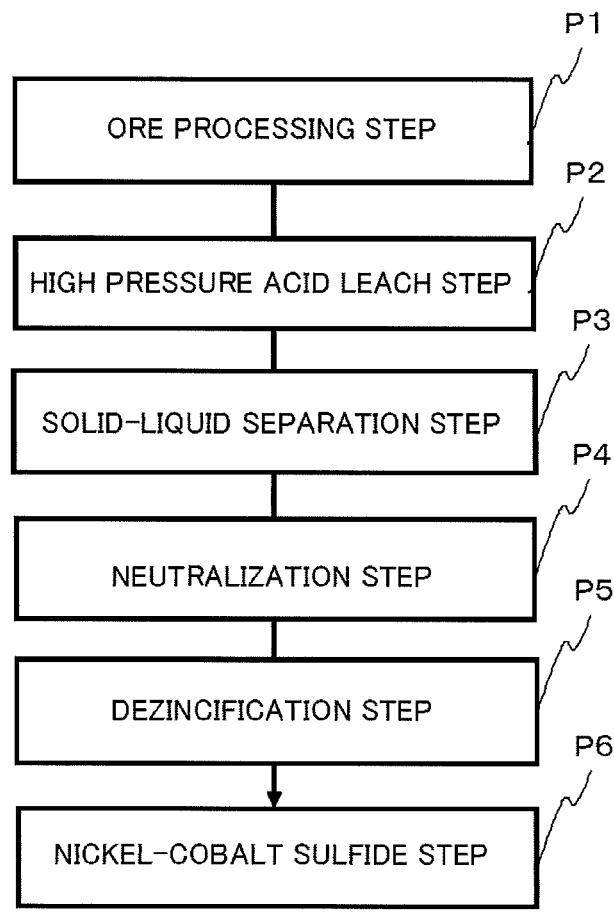
FIG. 2 shows steps of procedures for leaching nickel and cobalt using high pressure acid leach for nickel oxide ore.

As illustrated in FIG. 2, the high pressure acid leach for nickel oxide ore includes an ore processing step P1, a high pressure acid leach step P2, a solid-liquid separation step P3, a neutralization step P4, a dezincification step P5, and a nickel-cobalt sulfurizing step P6.

In the ore processing step P1, large blocks, gangues, wood roots and others are removed from nickel oxide ore and ore slurry having a predetermined concentration is prepared.

In the subsequent high pressure acid leach step P2, the ore slurry transferred from the ore processing step is preheated by preheaters. The preheated ore slurry is leached in an autoclave under high temperature and pressure conditions by using sulfuric acid while high pressure air and high pressure steam are being blown into the autoclave. Then, the temperature and pressure of the high-temperature and high-pressure slurry after leach are reduced by using the flash vessel 10.

In the subsequent solid-liquid separation step P3, the slurry after leach is separated into solid and liquid to obtain leachate and leach residue.

In the subsequent neutralization step P4, limestone slurry is added to the leachate to remove impurities such as iron and aluminum.

In the subsequent dezincification step P5, impurities of zinc and copper are removed as sulfide from the leachate by sulfide sedimentation.

In the nickel-cobalt sulfurizing step P6, nickel-cobalt mixture sulfide is extracted from the leachate by sulfide sedimentation.

The nickel oxide ore is so-called laterite chiefly constituted by limonite and saprolite. The laterite generally has a nickel content in the range from 0.5% to 2.0% by mass, containing nickel as hydroxide or magnesium silicate ore. On the other hand, the laterite has an iron content in the range from 20% to 50% by mass, containing iron chiefly in the form of trivalent hydroxide (goethite, FeOOH), and partially divalent iron in magnesium silicate ore.

The slurry concentration of the ore slurry manufactured in the ore processing step P1 is greatly dependent on the properties of nickel oxide ore to be processed, and is therefore not particularly limited, however, it is preferable that the slurry concentration of the slurry after leach is high and this concentration is generally adjusted in the range from 20% to 50% by mass. That is, when the slurry concentration of the slurry after leach is lower than 20% by mass, large equipment is required to obtain the same residence time for each of the respective steps including the leach step and in addition, the additive amount of acid increases for adjustment of the residue acid concentration. Moreover, the nickel concentration of the obtained leachate becomes lower, with a result that the final recovery rate may decrease. e may decrease. On the other hand, when the slurry concentration exceeds 50% by mass, the scale of the equipment decreases, however, the viscosity of the slurry itself increases, it may be difficult to transfer using a pump (due to frequent closure inside the pipe and high energy consumption, for example).

Examples of practical equipment used in the high pressure acid leach step P2 include three preheaters, an autoclave, and three flash vessels, for example.

In this case, the flash vessel 10 contains a cylindrical vessel having a size approximately in the range from 4 m to 6 m in diameter and approximately in the range from 10 m to 12 m in height, and vertically installed. The slurry introduced into the first stage flash vessel has a temperature in the range from 200° C. to 270° C., for example, and a pressure in the range from 1.8 MPaG to 5.8 MPaG, for example.

The flash vessel 10 used in the high pressure acid leach step P2 is constructed as follows, for example.

The lower part of the hydrostatic tower 20 having a diameter of 250 mm was coupled with the slurry outlet pipe 14 at the intermediate position between the connection position of the slurry outlet pipe 14 and the flash vessel 10 and the position of the slurry outlet valve 16 (position shifted from the connection position by approximately 50 cm). The upper part of the hydrostatic tower 20 having a diameter of 250 mm was coupled with the vapor outlet pipe 15 at the position shifted from the connection position of the vapor outlet pipe 15 and the flash vessel 10 by approximately 50 cm.

The one liquid level sensor 21A was provided on the hydrostatic tower 20 at the position shifted from the bottom of the flash vessel 10 by approximately 6.5 m (the same level as predetermined maximum liquid level). In addition, the one liquid level sensor 21B was provided at the position shifted from the bottom of the flash vessel 10 by approximately 4.5 in (the same level as predetermined minimum liquid level). The length of 250 mm as the diameter of the hydrostatic tower 20 corresponds to ¹⁄₂₀ of the diameter of the main body which is approximately 5 m.

The flash vessel 10 thus constructed is operated in the high pressure acid leach step P2 in the following manners.

Slurry is successively introduced into the flash vessel 10. When the maximum liquid level sensor 21A detects a rising liquid level at the time of closure of the slurry outlet valve 16, a signal for opening the valve is transmitted to the slurry outlet valve 16. Based on this signal, the slurry outlet valve 16 is opened to transfer the slurry within the flash vessel 10 to the subsequent step. By discharge of the slurry within the flash vessel 10 to the subsequent step, the slurry liquid level within the flash vessel 10 lowers. When the minimum liquid level sensor 21B detects a dropping liquid level, a signal for closing the outlet valve is transmitted to the slurry outlet valve 16. Based on this signal, the slurry outlet valve 16 is closed, whereby the slurry liquid level within the flash vessel 10 starts rising again. The work can continue by repeating these procedures.

EXAMPLE

The invention is hereinafter described in more detail in conjunction with an example of the invention and a comparison example. It is intended that the invention is not limited to these examples, however, the metals used in the example and comparison example were analyzed using ICP spectroscopy.

Table 1 shows results of analysis for ore slurry of nickel oxide ore used in the example and comparison example.

TABLE 1

| SOLID CONTENT | % BY MASS | 20-50 |
|---|---|---|
| PARTICLE DIAMETER OF SOLID CONTENT | mm | <2.0 |
| Ni | % BY MASS | 0.5-2.5 |
| Co | % BY MASS | 0.01-0.20 |
| Fe | % BY MASS | 20-50 |
| Si | % BY MASS | 3-15 |
| Mn | % BY MASS | 1-10 |
| pH | — | 4-6 |

Example 1

Employed was a practical plant for nickel oxide ore incorporating an example of practical equipment which executes the high pressure acid leach step discussed above.

Slurry produced by leaching ore slurry shown in Table 1 and adjusting the slurry after leach to approximately 245° C. and approximately 4 MPaG at the exit of the autoclave was introduced into a first stage flash vessel. The slurry introduced into the first flash vessel was sequentially transferred to the second stage and third stage flash vessels to decrease the pressure of the slurry after leach to the ordinary pressure. This work was executed for six months.

During the work, no trouble was found resulting from damage to the vapor outlet pipe, slurry outlet pipe, and slurry outlet valve.

Comparison Example 1

The same work as that of Example 1 was executed not using the practical equipment example for the high pressure acid leach step discussed herein, but using conventional equipment not provided with a hydrostatic tower.

During the work, troubles resulting from damage to the vapor outlet pipe, slurry outlet pipe, and slurry outlet valve were caused approximately once a month and repair work and equipment replacement were needed every time those troubles occurred. Accordingly, work efficiency decreased, and the equipment cost increased.

REFERENCE SIGNS LIST

1 body; 2 ceiling portion; 3 slurry inlet port; 4 slurry outlet port; 5 vapor outlet port; 10 flash vessel; 13 slurry inlet pipe; 14 slurry outlet pipe; 15 vapor outlet pipe; 16 slurry outlet valve; 20 hydrostatic tower; 21A maximum liquid level sensor; 21B minimum liquid level sensor

The invention claimed is:

1. A flash vessel whose liquid level rises and drops considerably used in a high pressure acid leach step which includes leaching nickel oxide ore slurry under high temperature and pressure conditions by using an autoclave, and reducing the temperature and pressure of the slurry after leach to the ordinary temperature and ordinary pressure by using the flash vessel, comprising:
   a hydrostatic tower whose lower part is coupled on a slurry outlet pipe between the connection position of the slurry outlet pipe and the flash vessel and the position of a slurry outlet valve, and whose upper part is coupled on a vapor outlet pipe;
   at least one maximum liquid level sensor provided at a position at the same level as a maximum liquid level not causing inflow of the slurry into the vapor outlet pipe due to considerable rise and drop of the slurry liquid level within the liquid phase space of the flash vessel to detect a rising liquid level within the hydrostatic tower; and
   at least one minimum liquid level sensor provided, at a position at the same level as a minimum liquid, level not causing inflow of vapor into the slurry outlet pipe due to considerable rise and drop of the slurry liquid level within the liquid phase space to detect a dropping liquid. level within the hydrostatic tower; and
   a slurry outlet valve controlled opening and closing according to the detection output by the maximum liquid level sensor and the minimum liquid level sensor detecting the liquid level of the hydrostatic tower, opened when the maximum liquid level sensor detects a rising liquid level within the hydrostatic tower and closed when the minimum liquid level sensor detects a dropping liquid level within the hydrostatic tower.

2. The flash vessel according to claim 1, wherein a diameter A of the hydrostatic tower lies in the range $1/100 \times B \leq A \leq 1/5 \times B$ in comparison with a diameter B of the flash vessel.

3. A method for operating a flash vessel whose liquid level rises and drops considerably used in a high pressure acid leach step which includes nickel oxide ore slurry under high temperature and pressure conditions by using an autoclave, and reducing the temperature and pressure of the slurry after leach to the ordinary temperature and ordinary pressure by using the flash vessel, the method comprising:
   detecting a liquid level within a hydrostatic tower whose lower part is coupled on a slurry outlet pipe between the connection position of the slurry outlet pipe and the flash vessel and the position of a slurry outlet valve, and whose upper part is coupled on a vapor outlet pipe;
   by using at least one maximum liquid level sensor provided at a position at the same level as a maximum liquid level not causing inflow of the slurry into the vapor outlet pipe due to considerable rise and drop of the slurry liquid level within the liquid phase space of the flash vessel, and at least one minimum liquid level sensor provided at a position at the same level as a minimum liquid level not causing inflow of vapor into the slurry outlet pipe due to considerable rise and drop of the slurry liquid level within the liquid phase space; and
   opening a slurry outlet valve provided on a slurry outlet pipe derived from the flash vessel when the maximum liquid level sensor detects a rising liquid level within the hydrostatic tower, and closing the slurry outlet valve when the minimum liquid level sensor detects a dropping liquid level within the hydrostatic tower.

* * * * *